Patented Mar. 2, 1954

2,671,066

UNITED STATES PATENT OFFICE 2,671,066

SOLUTIONS OF ACRYLONITRILE POLYMERS CONTAINING AN INORGANIC ACID SALT OF AN ORGANIC AMINE

John L. Justice, Chester, Pa., assignor, by mesne assignments, to The Chemstrand Corporation, Decatur, Ala., a corporation of Delaware No Drawing. Application September 7, 1950, Serial No. 183,683

13 Claims. (Cl. 260—32.6)

1

This invention relates to improved solutions of a fiber-forming polymeric material comprising an acrylonitrile polymer.

The solutions normally obtained by intimately mixing at least 5 percent of an acrylonitrile polymer containing at least 80 percent of acrylonitrile by weight in the molecule, or of blends comprising such an acrylonitrile polymer, in the known organic solvents for the polymers, are characterized by undesirably high viscosity and are less fluid and mobile than is required for spinning the solutions into fibers at high spinning speeds. For example, in spinning the solutions normally obtained by mixing the acrylonitrile polymer or blend with an organic solvent therefor, by a continuous wet-spinning process in which the solution is extruded into the bath, the fibers are withdrawn over a godet, forwarded directly to a washing drum or the like, thence over a drying device and through a heat-stretching tube to a second godet, and finally to a collecting means, the speed at which the fibers can be withdrawn from the bath and passed over the rotating godets and drums is limited by the high viscosity of the solutions.

The objectionably high viscosity of the solution is particularly noticeable and troublesome in the case of those solutions obtained by intimately mixing at least 5 percent of a blend comprising a fiber-forming acrylonitrile polymer containing at least 80 percent of acrylonitrile with an organic solvent such as N,N-dimethylformamide, N,N-dimethylacetamide, sulfolane, etc. For example, the viscosity of a solution of at least 10 percent of a substantially homogeneous copolymer of 98 percent acrylonitrile and 2 percent vinyl acetate in dimethylacetamide is too high for rapid spinning, but it is lower than the viscosity of a solution of a blend of such a copolymer of 98 percent acrylonitrile and 2 percent vinyl acetate with a substantially homogeneous copolymer of from 30 to 90 percent of a vinyl-substituted heterocyclic tertiary amine and from 10 to 70 percent of acrylonitrile, the total polymer concentration of the solutions being equal.

The principal object of this invention is to provide organic solvent solutions of the acrylonitrile polymers which are characterized by relatively low viscosity and increased fluidity or mobility as compared to the viscosity and mobility of the solutions normally obtained by intimately mixing a fiber-forming acrylonitrile polymer containing at least 80 percent of acrylonitrile with an organic solvent therefor. Another object is to provide solutions of the polymers which can be spun into fibers at high spinning speeds.

2

These and other objects are achieved, in accordance with the invention, by intimately mixing the acrylonitrile polymer or polymer blend with the selected organic solvent and a minor proportion of an inorganic acid salt of an organic amine selected from the group consisting of dimethylamine hydrochloride, hydroxylamine hydrochloride, phenylhydrazine hydrochloride, and aniline sulfate.

The inorganic acid salt of the organic amine functions to appreciably lower the viscosity and increase the fluidity of the polymer solutions, which in turn permits the steps of washing, drying, and heat-stretching the fibers to be performed continuously at high speed. The modification of the viscosity of the solutions appears to be a purely physical (colloid) phenomenon and is obtained regardless of the organic solvent used, and independently of any modification of the color of the solution, and whether the solvent is one which liberates an amine on heating or not.

The inorganic acid salt of the organic amine may be used to lower the viscosity and improve the fluidity of a solution of the acrylonitrile polymer or blend in any solvent which dissolves the polymer, or blend, to produce solutions of from 5 to 30 percent concentration, and which is also a solvent for the amine salt.

The amount of the inorganic acid salt of the organic amine used to modify the solution viscosity may vary. Preferably, the salt is used in an amount of from 0.1 to 5 percent based on the weight of the organic solvent.

In a preferred embodiment of the invention, the solutions are prepared by dissolving the amine inorganic acid salt in the organic solvent, and then dispersing the polymeric material in finely divided condition in the solution, at room temperature, with rapid stirring, followed by heating to complete the dissolution of the polymer.

The polymeric material may be an acrylonitrile polymer containing at least 80 percent of acrylonitrile in the molecule, including copolymers containing in addition to the acrylonitrile, up to 20 percent of another >C=C<-containing substance which is copolymerizable with acrylonitrile. For example, in addition to polyacrylonitrile, the polymer may be a copolymer of acrylonitrile with one or more of the following substances: acids such as acrylic, haloacrylic, and methacrylic acids; esters such as methyl methacrylate, butyl, octyl, methoxymethyl, and chlorethyl methacrylates and the corresponding esters of acrylic and α-chloracrylic acids; methacrylonitrile; vinyl and vinylidene halides such as vinyl chloride, vinyl fluoride, vinylidene chloride, vinylidene fluoride, 1-fluoro-1-chlorethylene; vinyl carboxylates such as vinyl acetate, vinyl chloracetate, vinyl propionate, and vinyl sterate; N-vinylimides such as N-vinylphthalimide and N-vinyl succinimides; N-vinylcaprolactam and N-vinylbutyrolactam; vinyl aryl compounds such as styrene and vinyl naphthalene; vinyl-substituted tertiary heterocyclic amines, such as the various isomeric vinylpyridines, e. g., 2-vinylpyridine, the various isomeric vinylpyrazines; allyl and vinyl amides in which the nitrogen atom is directly attached to the allyl or vinyl radical, such as N-allyl-formamide, N-methyallylformamide, N-ethallylformamide, allyl urea, N-allyl sulfonamides, N-vinyl-N-methylformamide, etc. Or the polymeric material may be a blend of a base polymer containing in the molecule at least 80 percent by weight of acrylonitrile with from 2 to not more than 50 percent on the weight of the blend of a modifying polymeric material. Various polymeric materials may be blended with the base polymer to modify it in various respects. Suitable modifying polymeric materials are those which are soluble in dimethylacetamide and which, when mixed with the base polymer in an amount of from 2 to 50 percent of the blend, result in a blend which forms a solution of at least 5 percent concentration in dimethylacetamide, which solution can be formed into fibers by conventional processes. For example, a base acrylonitrile polymer which is not dye-receptive, such as a copolymer of 95 to 99 percent acrylonitrile and 1 to 5 percent of vinyl acetate may be blended with a dye-receptive polymer, such as a copolymer of from 30 to 90 percent of a vinyl-substituted heterocyclic tertiary amine and from 10 to 70 percent of acrylonitrile, to produce a dye-receptive blend. These blends can be mixed with an organic solvent, such as dimethylacetamide, and the resulting mixture can be spun into filaments. However, the viscosity of solutions of a blend of two acrylonitrile polymers is higher than is indicated by the viscosities of the individual polymers and the mixture or "solution" comprising the blend is so viscous that it cannot be spun into filaments at high spinning speeds. In accordance with this invention, the viscosity of the mixture of dimethylacetamide and polymer blend is markedly lowered by the inclusion in the mixture of an inorganic acid salt of an organic amine as disclosed herein. The composition comprising the polymer, solvent, and inorganic acid salt of the organic amine is a highly fluid, clear, mobile solution which, unlike the product obtained without the use of the amine salt, does not contain suspended, undissolved gel particles.

The solutions are stable with respect to their viscosity and show no tendency to increase in viscosity on standing for long periods of time.

Further details of the practice of the invention are set forth in the following examples, in which the parts are by weight.

The viscosity values given in the examples were measured at 50° C. by the falling ball method using stainless steel balls one-quarter inch in diameter. The viscosity was calculated from the time of fall, using Bacon's modification of the Faxen equation (Bacon, J. Franklin Inst. 221, 251, 1936).

EXAMPLE I

Three parts of hydroxylamine hydrochloride were dissolved in 243 parts of dimethylformamide, and 54 parts of a copolymer containing 97 percent of acrylonitrile and 3 percent of vinyl acetate were added. The mixture was stirred with a "Lightning" mixer and heated to 80° C., at which temperature it was maintained until the copolymer was completely dissolved. The solution had a viscosity of 177 poises at 50° C. It contained 18 percent of the copolymer and 1 percent of hydroxylamine hydrochloride, by weight.

For comparison purposes, a solution of 54 parts of the copolymer in 246 parts of dimethylformamide was prepared under identical conditions, but omitting the hydroxylamine hydrochloride. The viscosity of this product was 233 poises at 50° C.

EXAMPLE II

Three parts of hydroxylamine hydrochloride were dissolved in 243 parts of dimethylacetamide and 54 parts of a 97 percent acrylonitrile-3 percent vinyl acetate copolymer were added. The mixture was treated as in Example I and a solution having a viscosity of 208 poises at 50° C. was obtained.

The product obtained from 54 parts of the copolymer and 246 parts of dimethylacetamide, under the same conditions, but in the absence of the hydroxylamine hydrochloride had a viscosity of 388 poises at 50° C.

EXAMPLE III

A copolymer of 97 percent acrylonitrile and 3 percent vinyl acetate, and a copolymer of 50 percent 2-vinyl pyridine and 50 percent acrylonitrile were blended in dimethylacetamide to obtain a 16.9 percent solution of the blended polymers. The overall 2-vinylpyridine content of the blend was 5 percent. For each 300 parts of dope there were added 5 parts of phenyl hydrazine hydrochloride. The mixture was stirred at 80° C., and maintained at that temperature until the blended polymers were completely dissolved. The resulting clear solution had a viscosity of 69 poises at 50° C. This compared with a viscosity of 132 poises at 50° C. for a mixture of dimethylacetamide and 18 percent by weight of the blended copolymers.

Other solutions of the same concentration were prepared by blending the same copolymers in the same relative proportions in dimethylacetamide containing varying amounts of inorganic acid salts of organic amines, and the viscosity of the solutions was measured and compared to the viscosity of a control solution containing the same amount of the blended polymers, but which did not contain the amine salt. The results are given in the following table, the amount of inorganic acid salt shown being the amount added per 300 parts of the solution.

*Table I*

| Inorganic Acid Salt of Organic Amine | Amount of Salt Added (Parts) | Viscosity in Poises at 50° C. |
|---|---|---|
|  |  | 145 |
| Dimethylamine hydrochloride | 1.0 | 115 |
| Do | 3.0 | 78 |
| Do | 5.0 | 71 |
| Hydroxylamine hydrochloride | 1.0 | 63 |
| Aniline Sulfate | 0.5 | 110 |
| Do | 2.0 | 88 |

EXAMPLE IV

One part of hydroxylamine hydrochloride was dissolved in dimethylacetamide and sufficient amounts of a copolymer containing 97 percent acrylonitrile and 3 percent of vinyl acetate, and of a copolymer containing 50 percent of acrylonitrile and 50 percent of 2-vinylpyridine were added at room temperature to produce a 16.9 solution of a blend having an overall 2-vinylpyridine content of 5 percent. The mixture was heated to 90–100° C. for one-hour period and mixing was continued for 45 minutes at 90–100° C. The solution was prefiltered through gamgee and allowed to stand for about 2 hours at room temperature. The final solution had a viscosity of 141 poises at 50° C. (ball fall, one-quarter inch balls, at 50° C. 14.4 seconds). It was pumped at the rate of 17.6 cc./min. through a spinneret having 40 holes, each 0.004 inch in diameter, into a mixture of water and dimethylacetamide containing 60 percent by volume of dimethylacetamide, at 50° C. After an immersion of 18 inches, the filaments were withdrawn over a godet (first godet) operating at a peripheral linear velocity of 40 ft./min., passed over a drum operating at a peripheral linear velocity of 100 ft./min. and washed on the drum. The fibers were stretched 150 percent between the first godet and the washing drum. They were then passed over a drying drum on which they were subjected to steam at 1 lb. pressure, and thence to a second godet through a tube in which they were subjected to steam at 40 lb. pressure. The second godet was rotated at a peripheral linear speed of 865 ft./min., the fibers being stretched between the drying drum and the second godet. This compared to a permissible maximum peripheral linear speed of 678 ft./min. for the second godet for control fibers formed from a 16.9 percent solution of the blend, and which did not contain the hydroxylamine hydrochloride. The fibers formed from the solution containing the hydroxylamine hydrochloride had a tenacity (dry) of 4.0 gms./denier.

Using steam at 50 lbs. pressure in the heat-stretching tube, the peripheral linear speed of the second godet could be increased to 1040 ft./min. to obtain fibers having a tenacity of 4.2 gms./denier. Using steam at 60 lbs. pressure, the speed of the second godet could be increased to 1187 ft./min. to obtain fibers having a tenacity of 4.5 gms./denier.

It will be apparent from the foregoing description that, by the practice of the present invention, it is possible to lower the objectionably high viscosity of the acrylonitrile polymer solutions and increase the spinning speed without sacrifice in the properties of the fibers obtained.

In addition to fibers, the compositions of the invention can be formed into other shaped articles such as films, sheets, casings, tubings, rods, etc.

The invention is defined by the appended claims.

I claim:

1. A new composition of matter adapted to be formed into shaped articles, comprising at least 5 percent of an acrylonitrile polymer containing, by weight in the polymer molecule, at least 80 percent of acrylonitrile, an organic solvent for the polymer, and from 0.1 to 5.0 percent based on the weight of the organic solvent of an inorganic acid salt of an organic amine selected from the group consisting of hydroxylamine hydrochloride, dimethylamine hydrochloride, phenylhydrazine hydrochloride, and aniline sulfate.

2. A composition as in claim 1, wherein the polymer is an acrylonitrile polymer containing, by weight in the molecule, at least 80 percent of acrylonitrile and at least 1 percent of another >C=C<-containing substance which is copolymerizable with acrylonitrile.

3. A composition as in claim 1, wherein the polymer comprises a blend of a base polymer containing, by weight in the molecule, at least 80 percent of acrylonitrile with from 2 to 50 percent on the weight of the blend of a copolymer containing from 30 to 90 percent of a vinyl-substituted tertiary heterocyclic amine and from 10 to 70 percent of acrylonitrile.

4. A composition as in claim 1, wherein the polymer comprises a blend of a base copolymer containing, by weight in the molecule, from 95 to 99 percent of acrylonitrile and from 1 to 5 percent of vinyl acetate, with from 2 to 5 percent on the weight of the blend of a copolymer containing from 30 to 90 percent of 2-vinylpyridine and from 10 to 70 percent of acrylonitrile.

5. A composition as in claim 1, wherein the amine salt is hydroxylamine hydrochloride.

6. A composition as in claim 1, wherein the amine salt is dimethylamine hydrochloride.

7. A composition as in claim 1, wherein the amine salt is phenylhydrazine hydrochloride.

8. A composition as in claim 1, wherein the amine salt is aniline sulfate.

9. A composition as in claim 1, wherein the organic solvent for the polymer is dimethylacetamide.

10. As a new composition of matter adapted to be formed into shaped articles, at least 5 percent of an acrylonitrile polymer containing, by weight in the molecule, from 95 to 99 percent of acrylonitrile and from 1 to 5 percent of vinyl acetate, dimethylacetamide, and from 0.1 to 5.0 percent on the weight of the dimethylacetamide of hydroxylamine hydrochloride.

11. As a new composition of matter adapted to be formed into shaped articles, at least 5 percent of a blend of a base polymer containing, by weight in the molecule, from 95 to 99 percent of acrylonitrile and from 1 to 5 percent of vinyl acetate with from 2 to 50 percent on the weight of the blend of a copolymer containing, by weight in the molecule, from 30 to 90 percent of a vinyl-substituted tertiary heterocyclic amine and from 10 to 70 percent of acrylonitrile, dimethylacetamide, and from 0.1 to 5 percent on the weight of the dimethylacetamide, of hydroxylamine hydrochloride.

12. As a new composition of matter adapted to be formed into shaped articles, at least 5 percent of a blend of a base polymer containing, by weight in the molecule, from 95 to 99 percent of acrylonitrile and from 1 to 5 percent of vinyl acetate, with from 2 to 50 percent of a copolymer containing, by weight in the molecule, about 50 percent of acrylonitrile and about 50 percent of 2-vinylpyridine, dimethylacetamide, and from 0.1 to 5.0 percent on the weight of the dimethylacetamide of hydroxylamine hydrochloride.

13. A composition as in claim 1, wherein the polymer is polyacrylonitrile.

JOHN L. JUSTICE.

References Cited in the file of this patent

UNITED STATES PATENTS

| Number | Name | Date |
|---|---|---|
| 2,497,526 | Arnold | Feb. 14, 1950 |
| 2,502,030 | Scheiderbauer | Mar. 28, 1950 |